W. D. PRIEST.
CAN OPENER.
APPLICATION FILED OCT. 17, 1910.
981,686.
Patented Jan. 17, 1911.
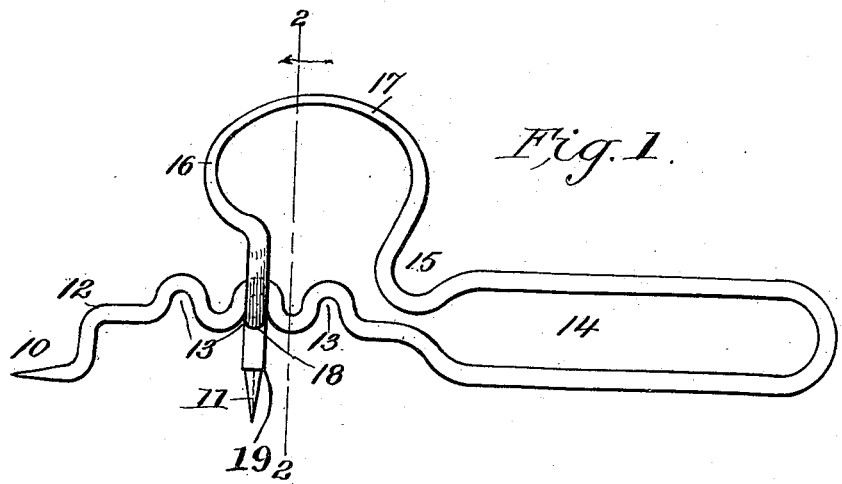
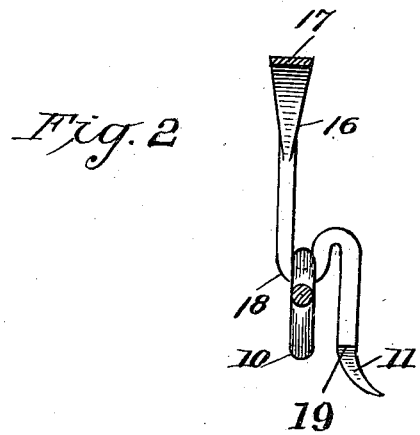
Witnesses
Inventor
W. D. Priest
By
Attorneys

UNITED STATES PATENT OFFICE.

WILLIAM D. PRIEST, OF SAN FRANCISCO, CALIFORNIA.

CAN-OPENER.

981,686.  Specification of Letters Patent.  Patented Jan. 17, 1911.

Application filed October 17, 1910. Serial No. 587,472.

*To all whom it may concern:*

Be it known that I, WILLIAM D. PRIEST, citizen of the United States, residing at San Francisco, in the county of San Francisco and State of California, have invented certain new and useful Improvements in Can-Openers, of which the following is a specification.

This invention relates to improvements in can openers, and has for one of its objects to provide a simply constructed device of this character which may be adjusted without removing any of the parts to cut openings of different sizes in cans.

With this and other objects in view, the invention consists of certain novel features of construction as hereinafter shown and described and then specifically pointed out in the claims; and, in the drawing illustrative of the preferred embodiment of the invention, Figure 1 is a side elevation of the improved device. Fig. 2 is a section on the line 2—2 of Fig. 1.

The improved implement is constructed from a single piece of wire bent into the required shape and pointed as shown at 10 at one end and with a cutting blade 11 at the opposite end. The body of wire is bent relatively close to the point 10 to form a shoulder 12 and then bent to form a plurality of spaced recesses 13 adjacent to the shoulder 12. Beyond the recesses 13 the body of wire is bent into a relatively elongated handle 14, the handle being formed by bending the material into parallel relations and then again bending the material in close relations in the form of a loop 15. The wire is then bent into a relatively large loop 16 and flattened as shown at 17 to decrease the resistance, as hereafter explained. Near the cutting terminal 11 the wire is bent into a loop 18 which is adapted to engage in the recesses 13 one at a time, as shown, and thus change the relative positions of the point 10 and the cutting blade 11 to increase or decrease the size of the "cut" which is to be made. The wire from which the improved device is constructed is preferably of steel, and will be suitably tempered after being bent into shape. It will thus be obvious that a simply constructed implement is produced, by means of which openings may be formed in cans varying in size within the range of the recesses 13. For instance, if a relatively small opening is required the loop 17 is pressed to release the loop 18 and transfer it to the outermost recess 13. Thus an opening in the can of any required size within the range of the recesses 13 may be cut, as will be obvious. A stop shoulder 19 limits the depth of the cut.

The improved implement is simple in construction, can be inexpensively manufactured and of any required size and any required strength.

Having thus described my invention, what is claimed as new is:

A can opener formed from a single piece of metal and comprising a shank and a handle, said shank having a can penetrating point at one end and a plurality of spaced recesses intermediate the ends an extension from said handle terminating in a can cutting blade and with a loop for engaging in the shank recesses one at a time, said extension having a resilient portion operating to maintain the loop yieldably in engagement with one of the recesses.

In testimony whereof, I affix my signature in presence of two witnesses.

WILLIAM D. PRIEST. [L. S.]

Witnesses:
 N. W. COLLINS,
 O. W. YEARGAIN.